United States Patent [19]

Saito

[11] Patent Number: 5,488,502

[45] Date of Patent: Jan. 30, 1996

[54] LIGHT BEAM SCANNING DEVICE AND IMAGE FORMATION LENS

[75] Inventor: Shinichiro Saito, Hachioji, Japan

[73] Assignee: Konica Corporation, Tokyo, Japan

[21] Appl. No.: 321,318

[22] Filed: Oct. 11, 1994

[30]   Foreign Application Priority Data

Oct. 14, 1993 [JP] Japan .................................. 5-280325

[51] Int. Cl.⁶ .................................................. G02B 26/08
[52] U.S. Cl. .......................... 359/205; 359/216; 359/710
[58] Field of Search ................................. 359/205–207, 359/216–220, 708, 710, 662; 250/236; 346/108

[56]         References Cited

U.S. PATENT DOCUMENTS 5,025,268  6/1991  Arimoto et al. ...................... 359/205

FOREIGN PATENT DOCUMENTS 2-23313   1/1990  Japan .
3-49408   7/1991  Japan .
4-60608   2/1992  Japan .
6-230308  8/1994  Japan .

*Primary Examiner*—James Phan
*Attorney, Agent, or Firm*—Finnegan, Henderson, Farabow, Garrett & Dunner

[57]                ABSTRACT

In a laser beam-scanning apparatus equipped with a rotatable polygonal mirror and an image formation lens system, a lens of the lens system has a cylindrical surface curved in the secondary scanning direction, wherein a radius curvature "rh" on the primary scanning direction section of the cylindrical surface is continuously changed in such a manner that a change pattern in the radius curvature "rh" is non-symmetrical in relation to the optical axis.

24 Claims, 21 Drawing Sheets

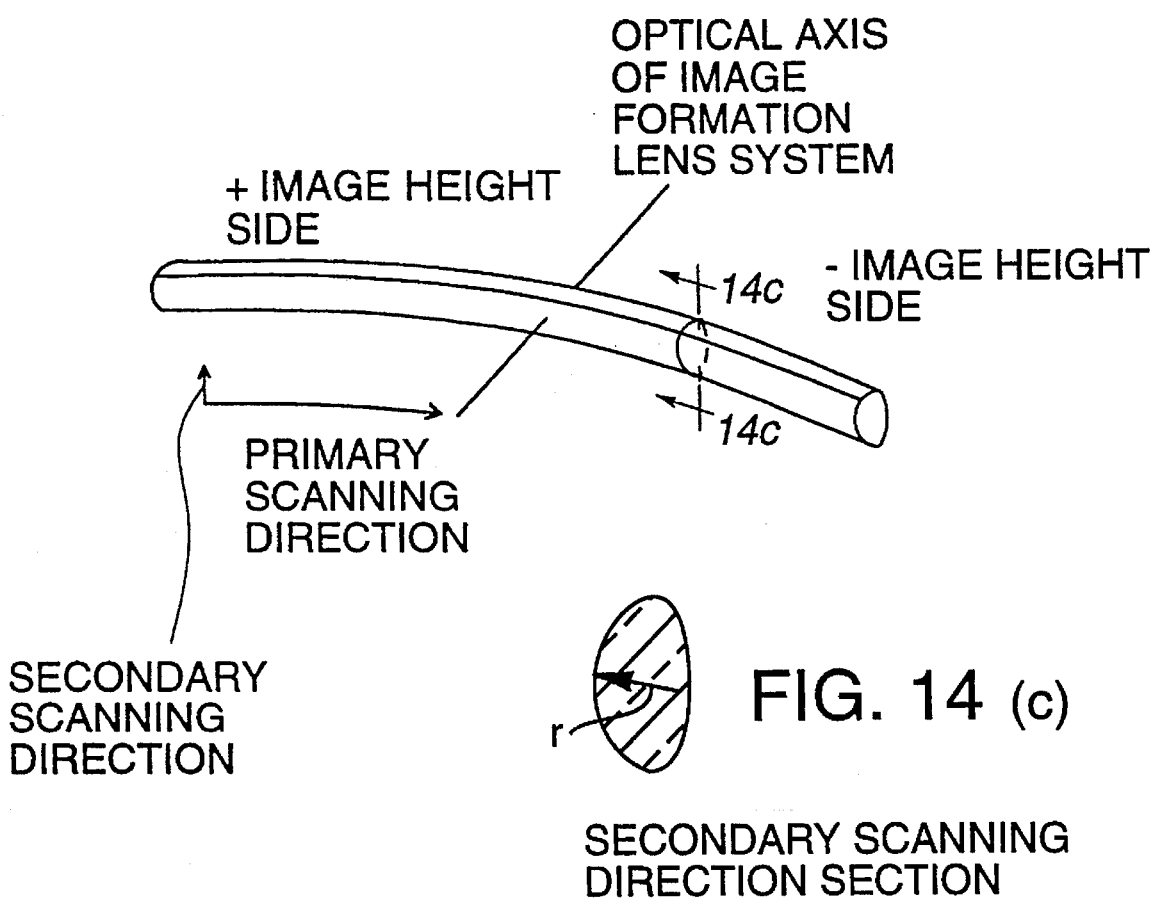

LIGHT BEAM SCANNING DEVICE AND IMAGE FORMATION LENS

BACKGROUND OF THE INVENTION

The present invention relates to a light beam scanning device, and more particularly relates to a small-sized light beam scanning device, by which deflection-scanning is conducted on a beam of light sent from a laser beam source, and an image formation cylindrical lens, wherein a rotational polygonal mirror is used for the scanning operation.

A rotational polygonal mirror 4 is as shown FIGS. 1(b) and 1(c) generally used for a light deflection means in an optical system of a light beam scanning device such as a laser beam printer and other devices as shown in FIG. 1(a). In the case where a rotational polygonal mirror is used in order to reduce the restriction of the allowance of the tilt of surface on a reflecting surface 41, the following conditions are commonly maintained:

In the secondary scanning direction, a reflecting surface 41 of the rotational polygonal mirror 4 and the surface 7 to be scanned are approximately set in a geometrical-optical conjugate relationship, and a light beam condensed on the surface of the secondary scanning direction is incident upon a position close to the aforementioned reflecting surface. However, as the rotational polygonal mirror is rotated, the position of the reflecting surface is moved. As a result, the aforementioned conjugate relationship can not be maintained. Therefore, an image formation point on the surface of the secondary scanning direction is shifted, so that an image surface curvature is caused with respect to the image formation point on the surface of the secondary scanning direction. Further, as illustrated in FIG. 1(a), a beam of light incident upon the aforementioned reflecting surface 41 is sent in the lateral direction forming an angle α with respect to an optical axis of the image formation lens system on a developed surface including the scanning line and an optical axis of the image formation lens system. Accordingly, a rotational center 5 of the rotational polygonal mirror is not located on the optical axis of the image formation lens system, so that the movement of the aforementioned reflecting surface is not symmetrical to the optical axis of the image formation lens system. For this reason, in the case where a lens system symmetrical to the optical axis of the image formation lens system is used, it is difficult to appropriately correct the image surface curvature of the image formation point on the secondary scanning direction all over the image formation regions of the surface to be scanned while consideration is given to the quantity of movement of the reflecting surface which is not symmetrical with respect to the optical axis of the image formation lens system.

Further, in the case where the required resolution is low, practical problems are not caused even when a lens system symmetrical with respect to the optical axis is used as the image formation lens system. However, when a large scanning angle is used in order to reduce size of the scanning device, or as the required resolution becomes higher, the curvature of the image surface is increased which remains in the case where the lens system symmetrical with respect to the optical axis is used as the image formation lens system.

A scanning device in which the image surface curvature is corrected overall the surface to be scanned is disclosed, for example, in Japanese Patent Publication No. 49408/1991. In this scanning device, a deformed cylindrical lens shown in FIG. 15 is used, in which the radius of curvature rh in a section of the secondary scanning direction is determined as a function of the distance h from the optical axis of the image formation lens system. Therefore, this deformed cylindrical lens can provide a wide field angle which can not be provided by conventional cylindrical or toric lenses. However, a change of the radius of curvature rh(+) on the "+" image height side of the cylindrical lens (the side in which the rotational center of the rotational polygonal mirror is located with respect to the optical axis of the image formation lens system) and the radius of curvature rh(−) on the "−" image height side (the side in which the rotational center of the rotational polygonal mirror is not located with respect to the optical axis of the image formation lens system) is symmetrical with respect to the optical axis of the image formation lens system. Therefore, this scanning device can not correct a fluctuation of the image formation position on a surface of the secondary scanning direction which is generated in accordance with the fluctuation of a reflecting surface position when a rotational polygonal mirror is used as a deflecting system.

According to a scanning device disclosed in Japanese Patent Publication Open to Public Inspection No. 23313/1990, the radius of curvature of a cylindrical lens on the secondary scanning direction is made to be non-symmetrical with respect to the optical axis of the image formation lens system and is monotonously increased in order to satisfactorily correct the fluctuation of the image formation position on the secondary scanning direction which is generated in accordance with the fluctuation of a reflecting surface position when a rotational polygonal mirror is used as a deflecting system. However, in this case, a lateral magnification of the image formation lens system is not less than 3 and not more than 5. As described above, the magnification is high. Accordingly, it is required to manufacture the device with a high degree of accuracy, with a resulting increase in cost. Further, since the lens, including the non-symmetrical surface, is made of glass, it is difficult to manufacture the non-symmetrical surface. Therefore, the manufacturing cost is raised from the view point of workability. Consequently, the above scanning device is not viable for mass production in terms of the cost.

In the scanning device disclosed in Japanese Patent Publication Open to Public Inspection 60608/1992, the shape of a cylindrical lens on the section of the primary scanning direction is non-symmetrical with respect to an optical axis of the image formation lens system, and a change of the radius of curvature of the cylindrical lens on the section of the secondary scanning direction is symmetrical with respect to an optical axis of the image formation lens system. In this case, the scanning angle is ±20°, which is small, and the size of the overall scanning device increases.

SUMMARY OF THE INVENTION

An object of the present invention is to provide an image formation lens system for use in an optical scanning system by which size of a scanning device can be reduced. This image formation lens system is applied to an optical scanning system arranged between a rotational polygonal mirror conducting deflection-scanning with a beam of light sent from a laser beam source, and a surface to be scanned. Therefore, an image point is formed on the scanned surface by the deflected light beam, and a reflecting surface of the rotational polygonal mirror and the scanned surface are approximately set in a geometrical-optical conjugate relationship on a secondary scanning direction. In this optical scanning system, a change in the image forming position on the secondary scanning direction, which is caused in accordance with the fluctuation of the reflecting surface position of the rotational polygonal mirror, can be appropriately corrected, that is, the image surface curvature at the image forming position on the secondary scanning direction in an image formation area on the scanned surface can be appropriately corrected. In the present invention, a scanning angle of an inexpensive image formation lens system for use in the optical scanning system, having high performance, (which is disclosed in Japanese Patent Application No. 39271/1993 applied by inventors), is wide-angled to ±50°, so that the size of the scanning device can be reduced.

Construction of the scanning device of the present invention is illustrated in FIG. 1(a), in which a developed drawing on a plane including a scanning line and an optical axis of the image formation lens system is shown. The scanning device of the present invention includes a rotational polygonal mirror 4 which conducts deflection-scanning on a beam of light sent from a laser light source 1. A rotational center 5 of the rotational polygonal mirror 4 is disposed deviating from an optical axis of the image formation lens system 6 to a "+" side (a "+" side means a side in which a rotational center of the rotational polygonal mirror is positioned with respect to an optical axis of the image formation lens system shown in FIG. 1(a), and a "−" side means a side in which a rotational center of the rotational polygonal mirror is not positioned with respect to an optical axis of the image formation lens system). An image formation lens system is disposed between the rotational polygonal mirror 4 and a surface 7 to be scanned, and an image is formed on the scanned surface 7 with a beam of deflected light. On the secondary scanning direction, the reflecting surface 41 of the rotational polygonal mirror and the surface to be scanned are approximately set in a geometrical-optical conjugate relationship. As illustrated in FIGS. 14(a), 14(b), and 14(c) the image formation lens system is characterized in that: the image formation lens system includes a cylindrical lens having a surface on which a change in the radius r of curvature in the section of the secondary scanning direction is non-symmetrical with respect to the distance h from the optical axis of the image formation lens system; and the image formation lens includes a cylindrical lens having a surface (hereinafter, called a deformed surface or a curved surface) in which the radius of curvature rh(−) on the surface of the secondary scanning direction at least on the "−" image height side is not larger than the radius of curvature $r_0$ on the surface of the secondary scanning direction on the optical axis of the image formation lens system.

There is a case in which the radius of curvature rh(+), on the surface of the secondary scanning direction on the "+" image height side in a range corresponding to an image formation area on the scanned surface, is larger than the radius of curvature $r_0$ on the surface of the secondary scanning direction on the optical axis of the image formation lens system, and a case in which the radius of curvature rh(+) is smaller than the radius of curvature $r_0$. The maximum value $|rh(+)|_{max}$ in the case of the larger radius of curvature and the minimum value $|rh(+)|_{min}$ in the case of the smaller radius of curvature are both located at the "+" image height end. In this case, the "+" image height end means the end of the "+" image height side of the deformed surface in a range corresponding to the image formation area on the scanned surface.

The minimum value $|rh(-)|_{min}$ of the radius of curvature rh(−) on the surface of the secondary scanning direction on the "−" image height side in a range corresponding to the image formation area on the scanned surface is located at the "−" image height end. Normally, the radius of curvature is monotonously changed from the radius of curvature $r_0$ on the surface of the secondary scanning direction on the optical axis of the image formation lens system to the maximum or minimum value. In this case, the "−" image height end means the end of the "−" image height side of the deformed surface in the range corresponding to the image formation area on the scanned surface.

When the radius of curvature rh on the surface of the secondary scanning direction of the deformed surface is expressed by the following equation, $$rh(\pm) = r_0 - k(\pm)\{|R| - \sqrt{R^2 - h^2}\} \qquad \text{①}$$

where, $r_0$: the radius of curvature on the surface of the secondary scanning direction on the optical axis of the image formation lens system, R: the radius of curvature on the section of the primary scanning direction h: the distance from the optical axis of the image formation lens system, for example, h≦0 on the "−" image height side, then a value obtained by the parenthesis of the second term on the right side is always "+" in the range of |R|>|h|. In this case, when K(±)>0, rh is monotonously decreased to the image height end, and when K(±)<0, rh is monotonously increased. It is desirable that a coefficient of the radius of curvature k(−) on the "−" image height side satisfies the following equation:

$$0 < k(-)/|R| \leq 0.003 \qquad \text{②}$$

In the optical scanning system in which the reflecting surface of a rotational polygonal mirror and the surface to be scanned are maintained in a conjugate relationship, the reflecting surface of the rotational polygonal mirror does not coincide with a rotational center, and a beam of light incident upon the reflecting surface of the rotational polygonal mirror is sent in a lateral direction so that the beam of light forms an angle α on the primary scanning direction with respect to the optical axis of the image formation lens system. For this reason, in the case where an optical scanning system symmetrical with respect to the optical axis of the image formation lens system is used, an image formation surface on the secondary scanning direction is curved non-symmetrically with respect to the optical axis of the image formation lens system. In order to correct this non-symmetry, it is necessary to include a surface non-symmetrical with respect to the optical axis of the image formation lens system, and on the surface, the radius of curvature of the secondary scanning direction section on the "+" image height side and that on the "−" image height side are different in the image formation lens system.

The lower limit value in equation ② is determined due to the reason that the image surface is excessively curved when the radius of curvature of the peripheral portion is not smaller than that on the optical axis of the image formation lens system at least on the "−" image height side. The upper limit value in the same equation is determined due to the reason that the image surface tends to be insufficiently curved when k(−) becomes too large.

PREFERRED EMBODIMENT OF THE INVENTION

Figure 1:
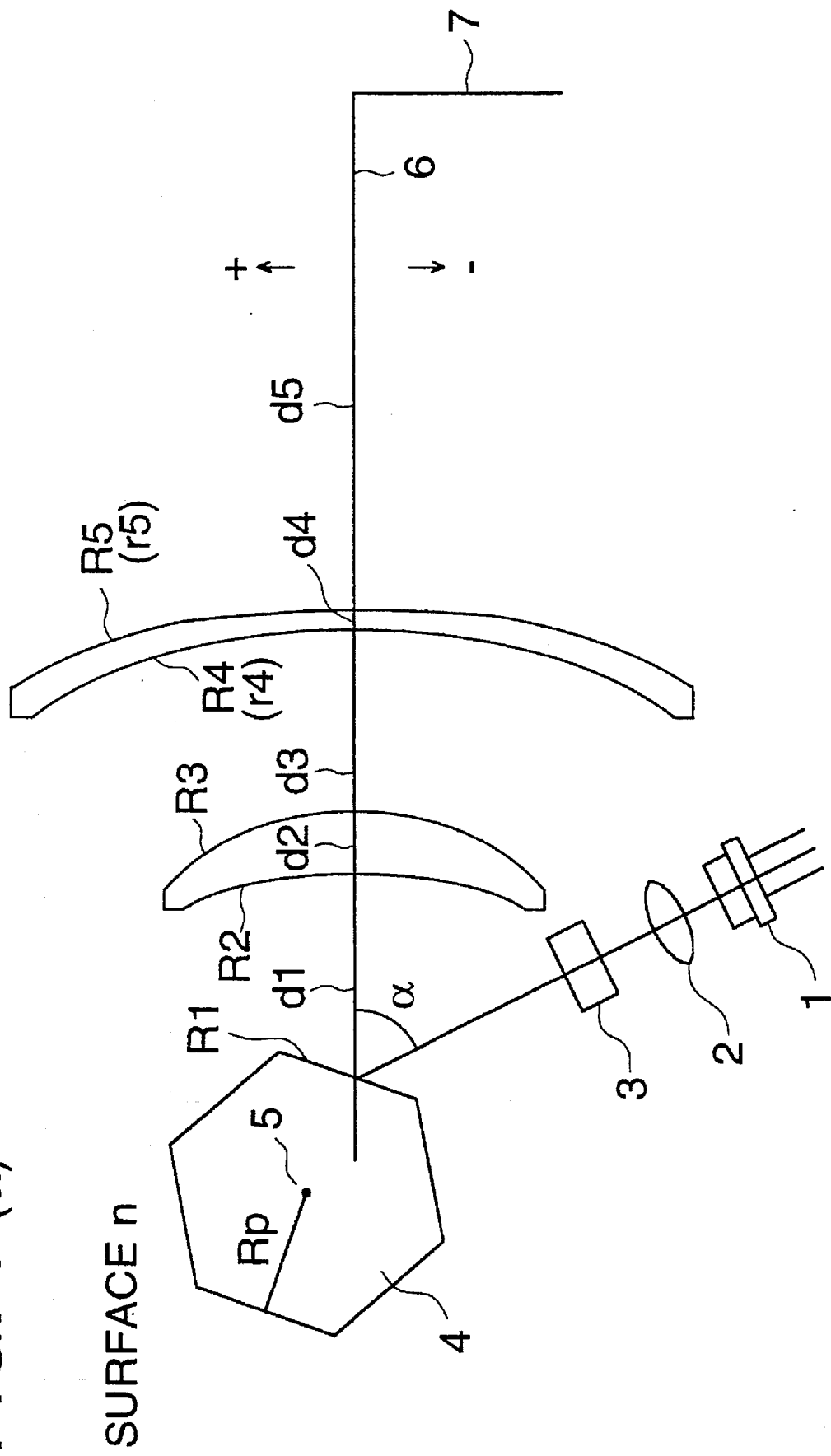
FIG. 1(a) is a development on a plane including a scanning line and an optical axis of an image formation lens system in a scanning device in which an optical scanning system of the present invention is used.
FIG. 1(b) is a view showing a polygonal mirror.
FIG. 1(c) is a view showing a reflecting surface of the mirror of FIG. 1(b).
Figure 1:
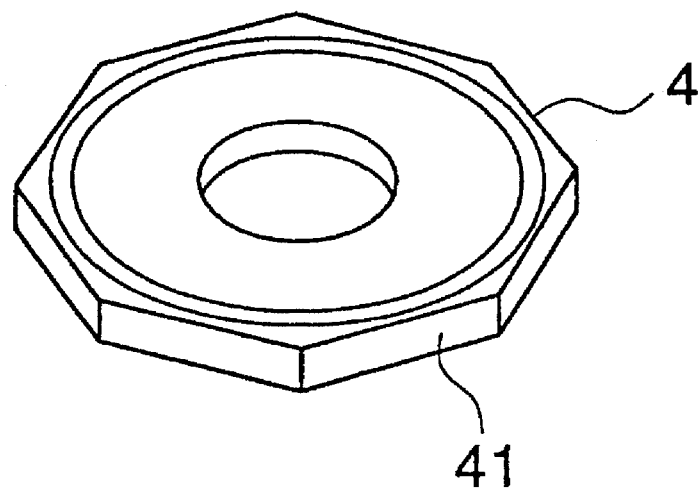
Figure 1:
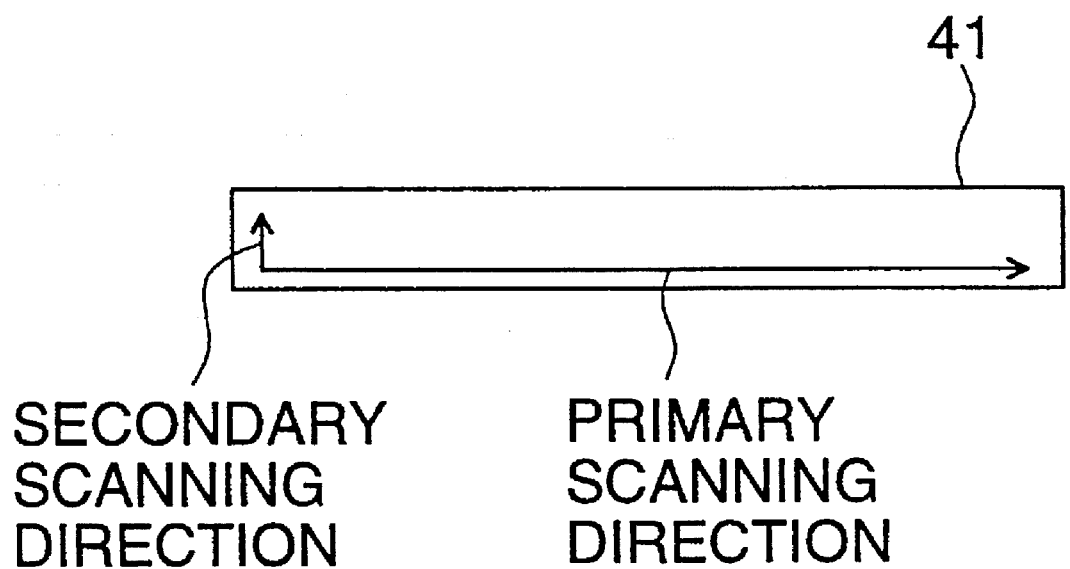
Figure 2:
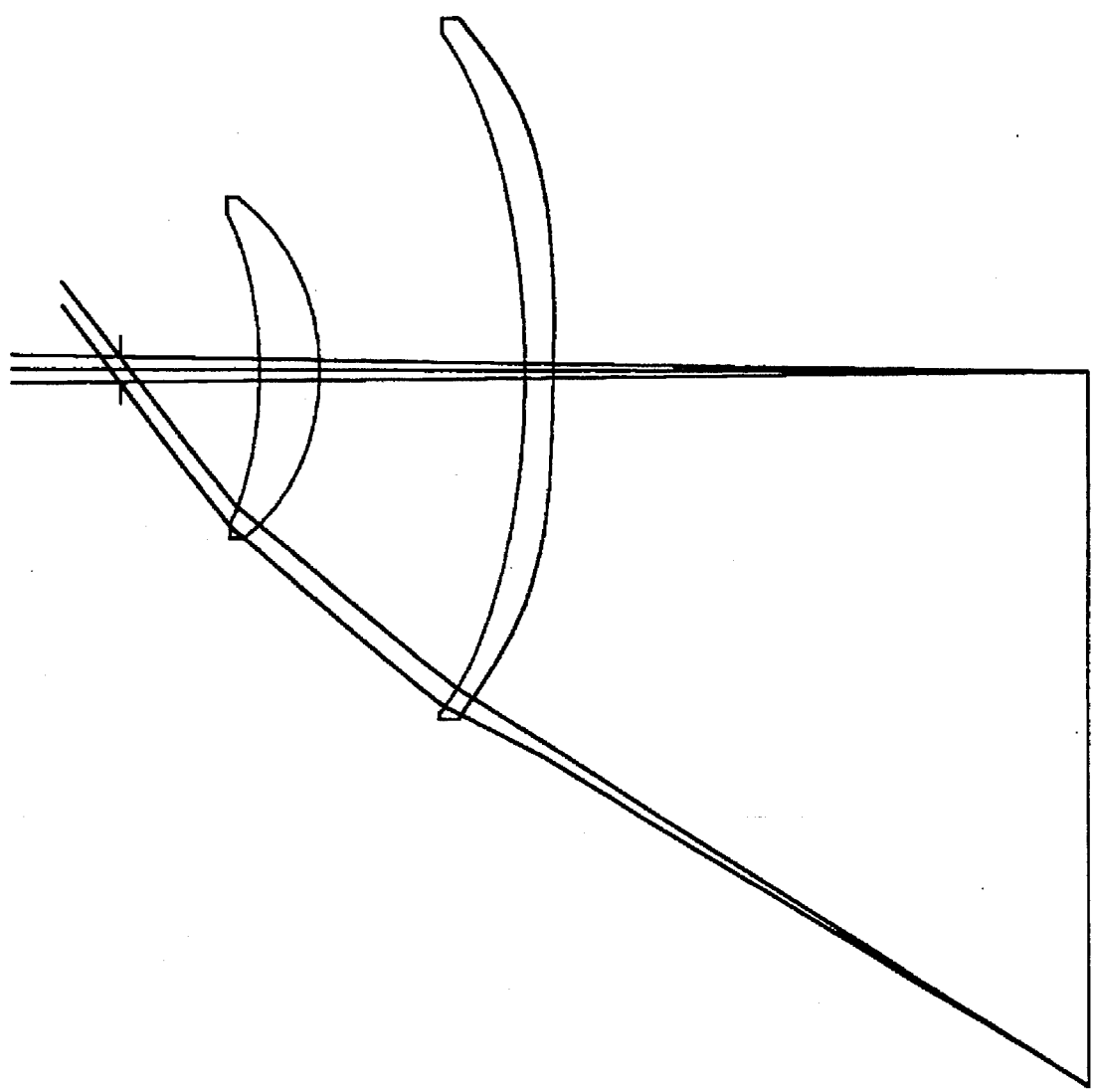
FIG. 2 is a sectional view of the primary scanning direction including the optical axis of the image formation lens system, wherein the sectional view shows the first embodiment of the image formation lens system of the present invention.
Figure 3:
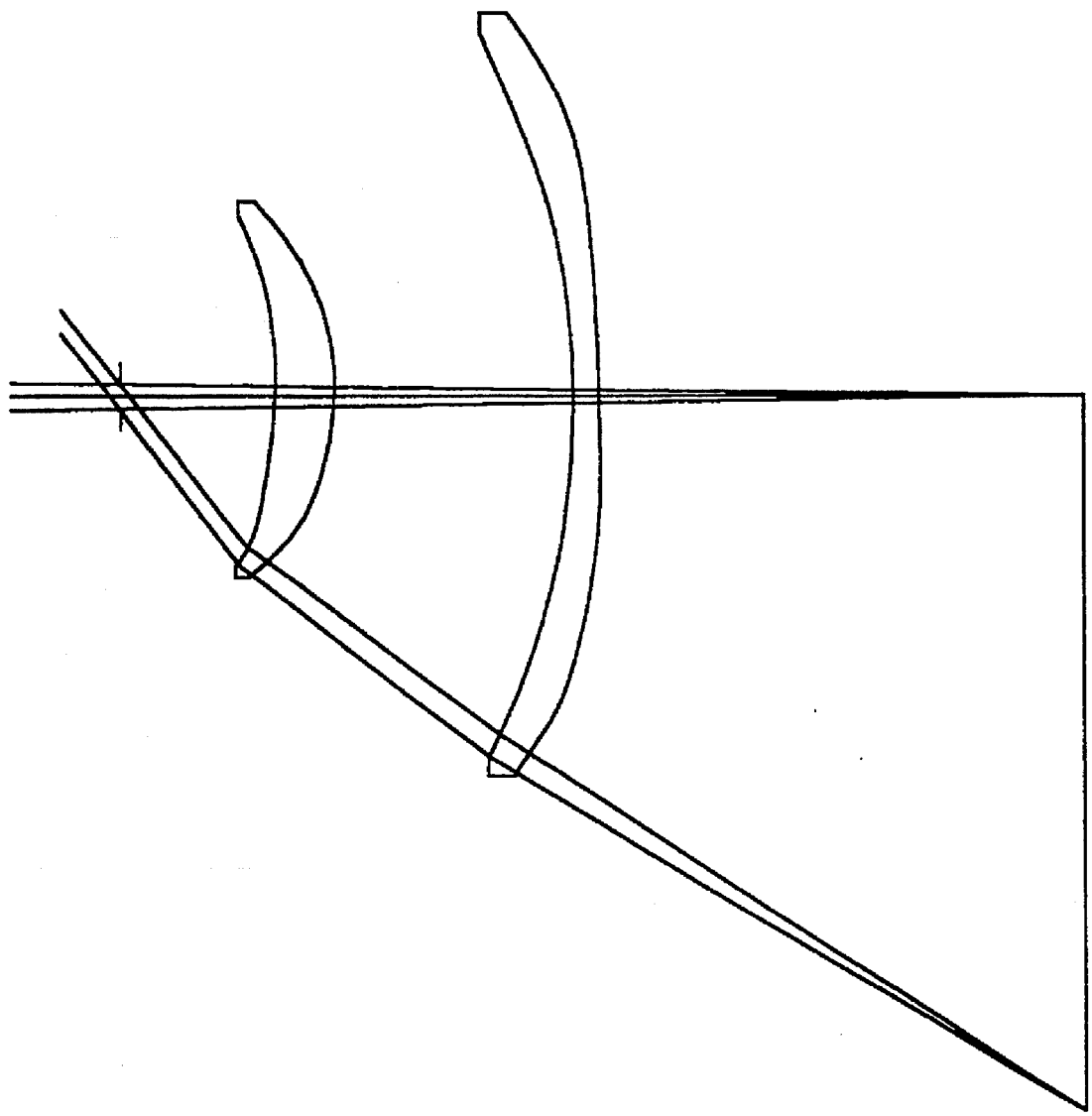
FIG. 3 is a sectional view of the primary scanning direction including the optical axis of the image formation lens system, wherein the sectional view shows the second embodiment of the image formation lens system of the present invention.
Figure 4:
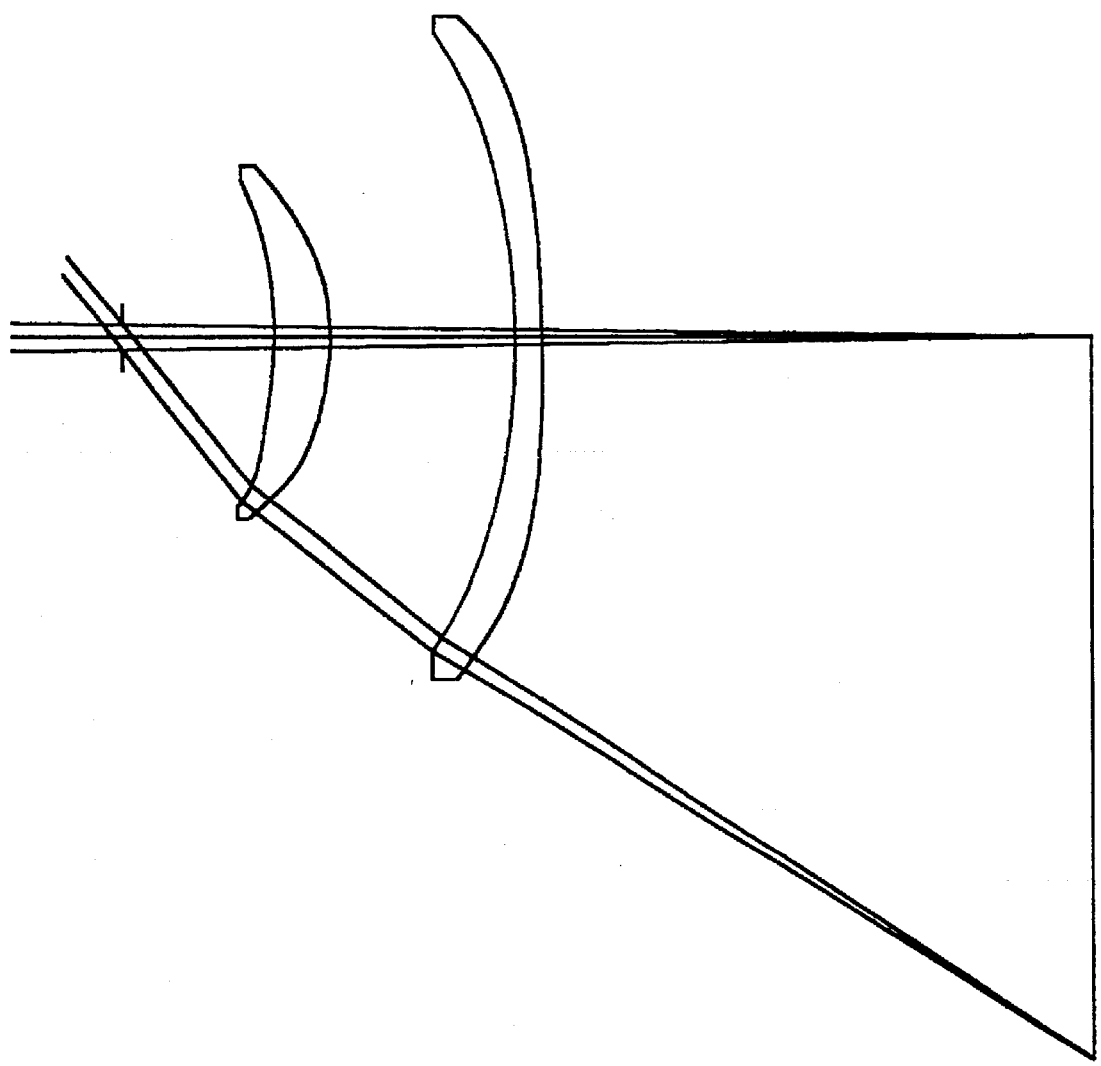
FIG. 4 is a sectional view of the primary scanning direction including the optical axis of the image formation lens system, wherein the sectional view shows the third embodiment of the image formation lens system of the present invention.
Figure 5:
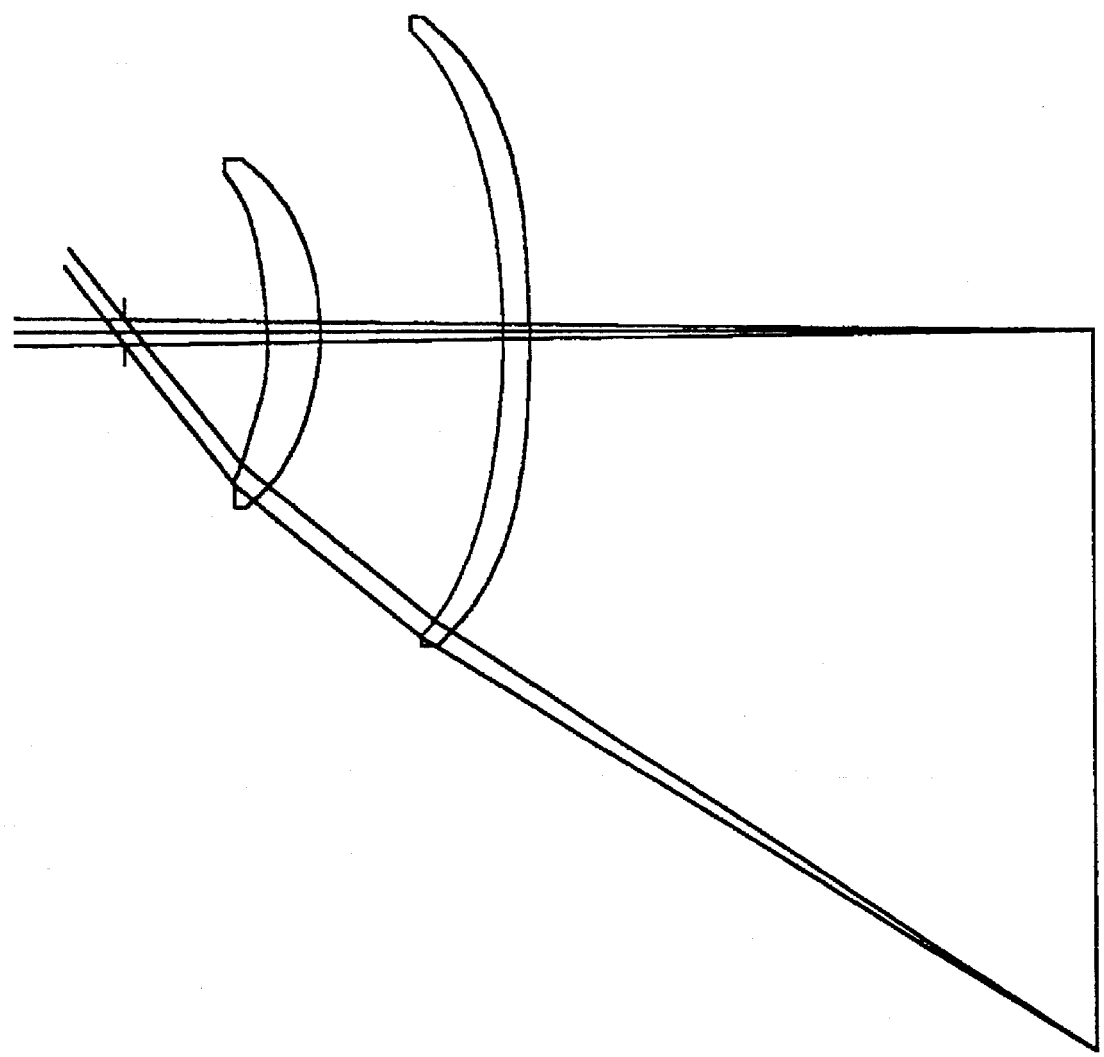
FIG. 5 is a sectional view of the primary scanning direction including the optical axis of the image formation lens system, wherein the sectional view shows the fourth embodiment of the image formation lens system of the present invention.
Figure 6:
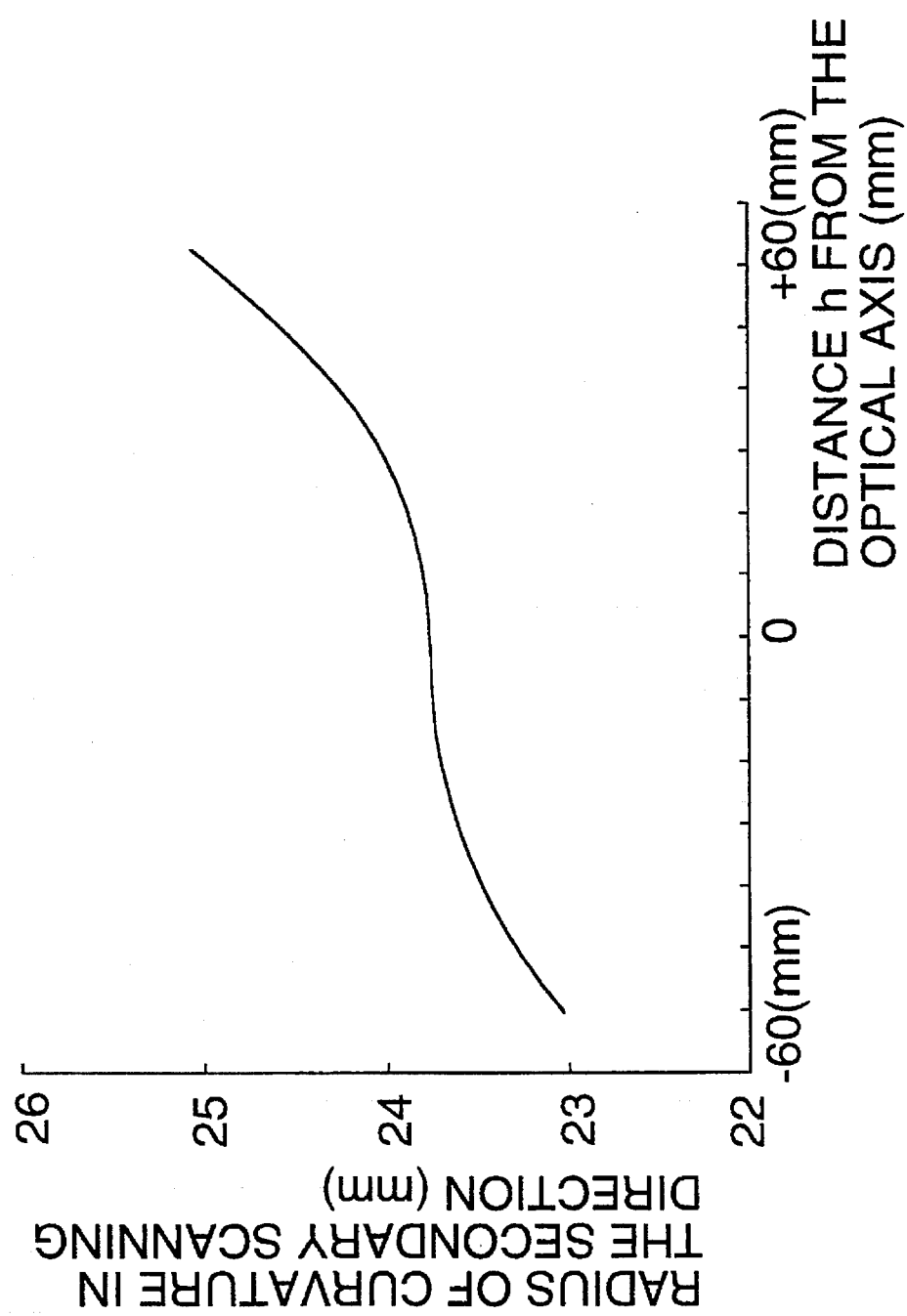
FIG. 6 is a sectional view of the primary scanning direction including the optical axis of the image formation lens system, wherein the sectional view shows a relationship of the radius of curvature rh of a secondary scanning direction of a deformed surface in the first embodiment of the optical scanning system of the present invention and a distance h from the optical axis of the image formation lens system.
Figure 7:
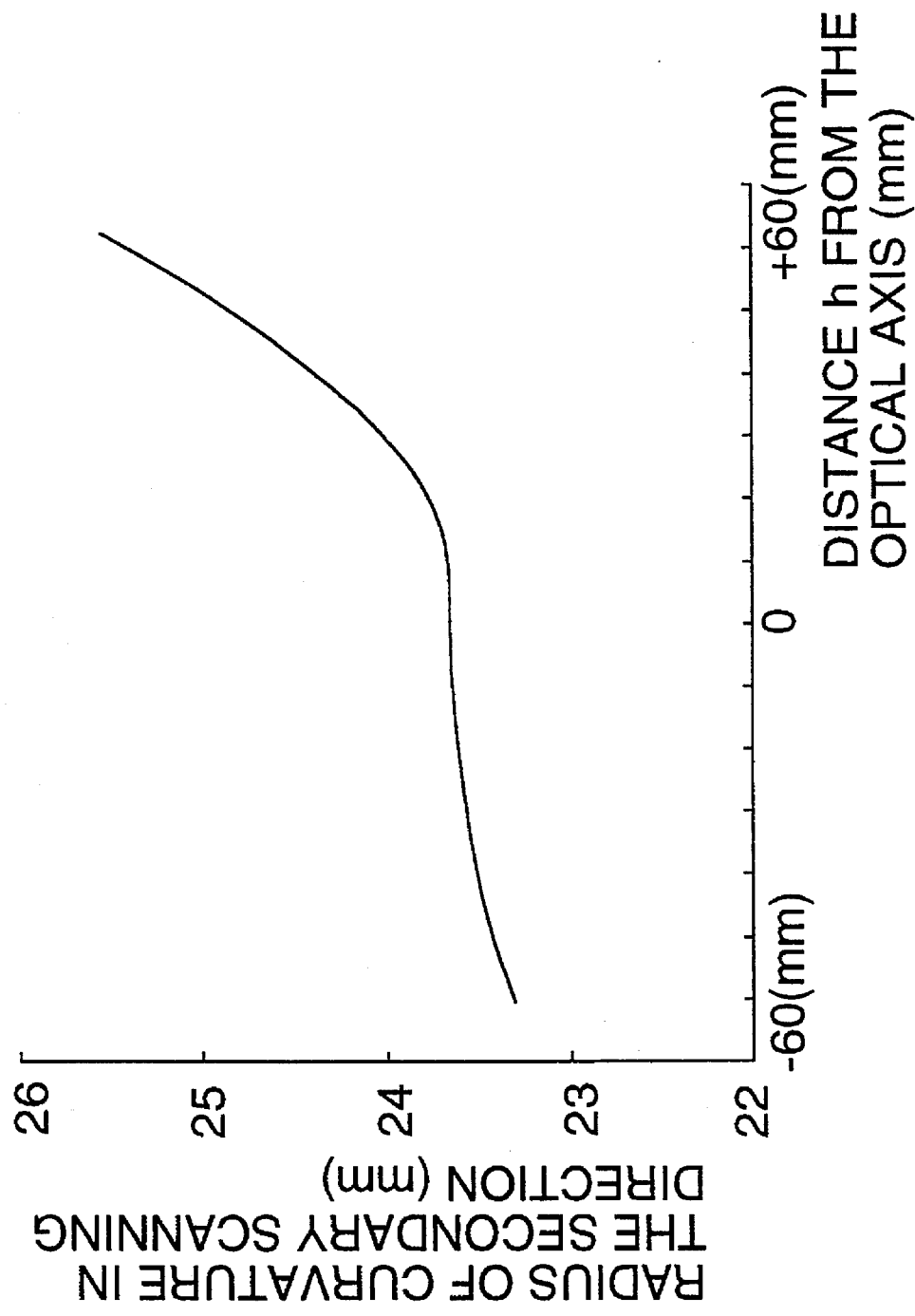
FIG. 7 is a sectional view of the primary scanning direction including the optical axis of the image formation lens system, wherein the sectional view shows a relationship of the radius of curvature rh of a secondary scanning direction of a deformed surface in the second embodiment of the optical scanning system of the present invention and a distance h from the optical axis of the image formation lens system.
Figure 8:
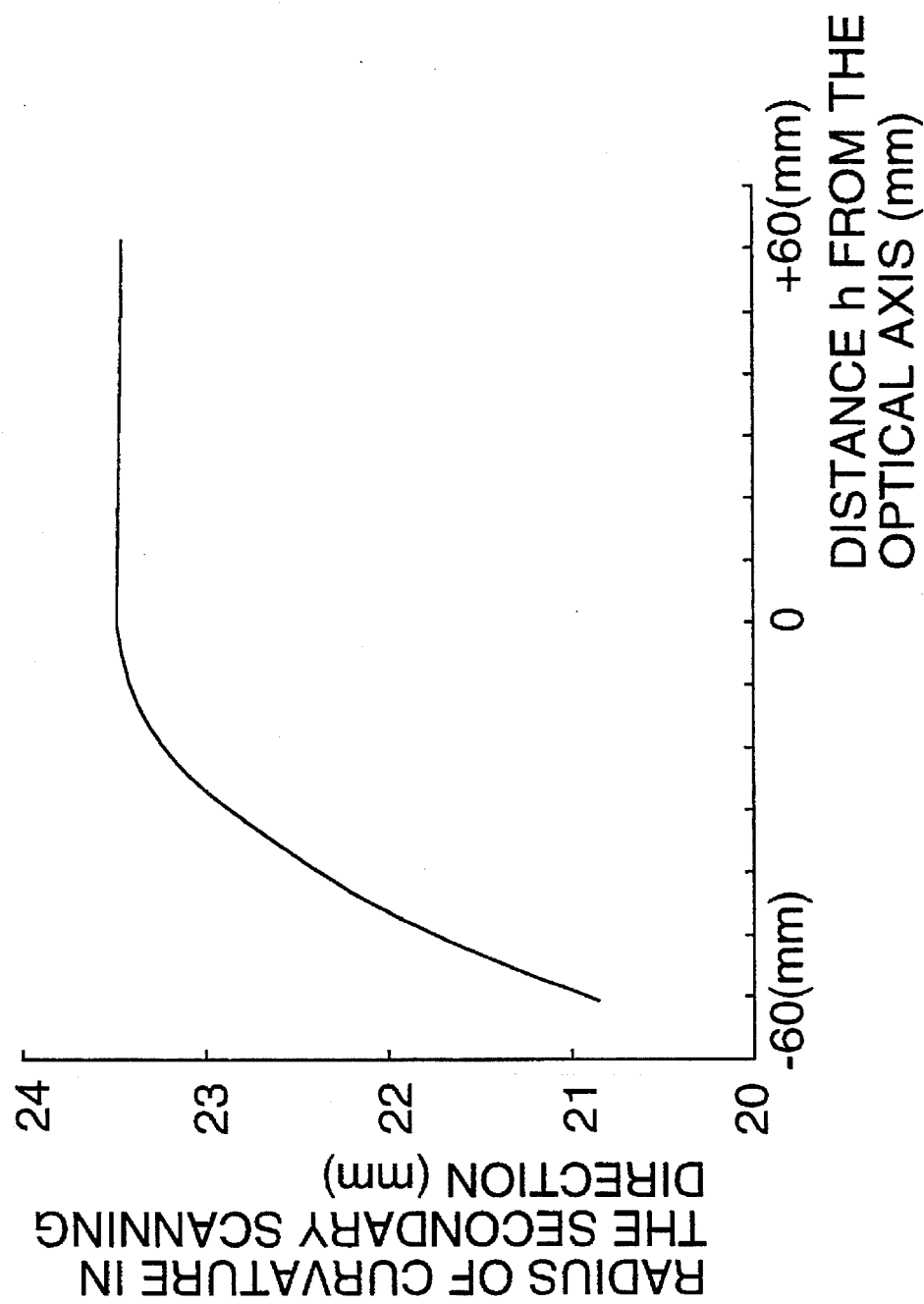
FIG. 8 is a sectional view of the primary scanning direction including the optical axis of the image formation lens system, wherein the sectional view shows a relationship of the radius of curvature rh of a secondary scanning direction of a deformed surface in the third embodiment of the optical scanning system of the present invention and a distance h from the optical axis of the image formation lens system.
Figure 9:
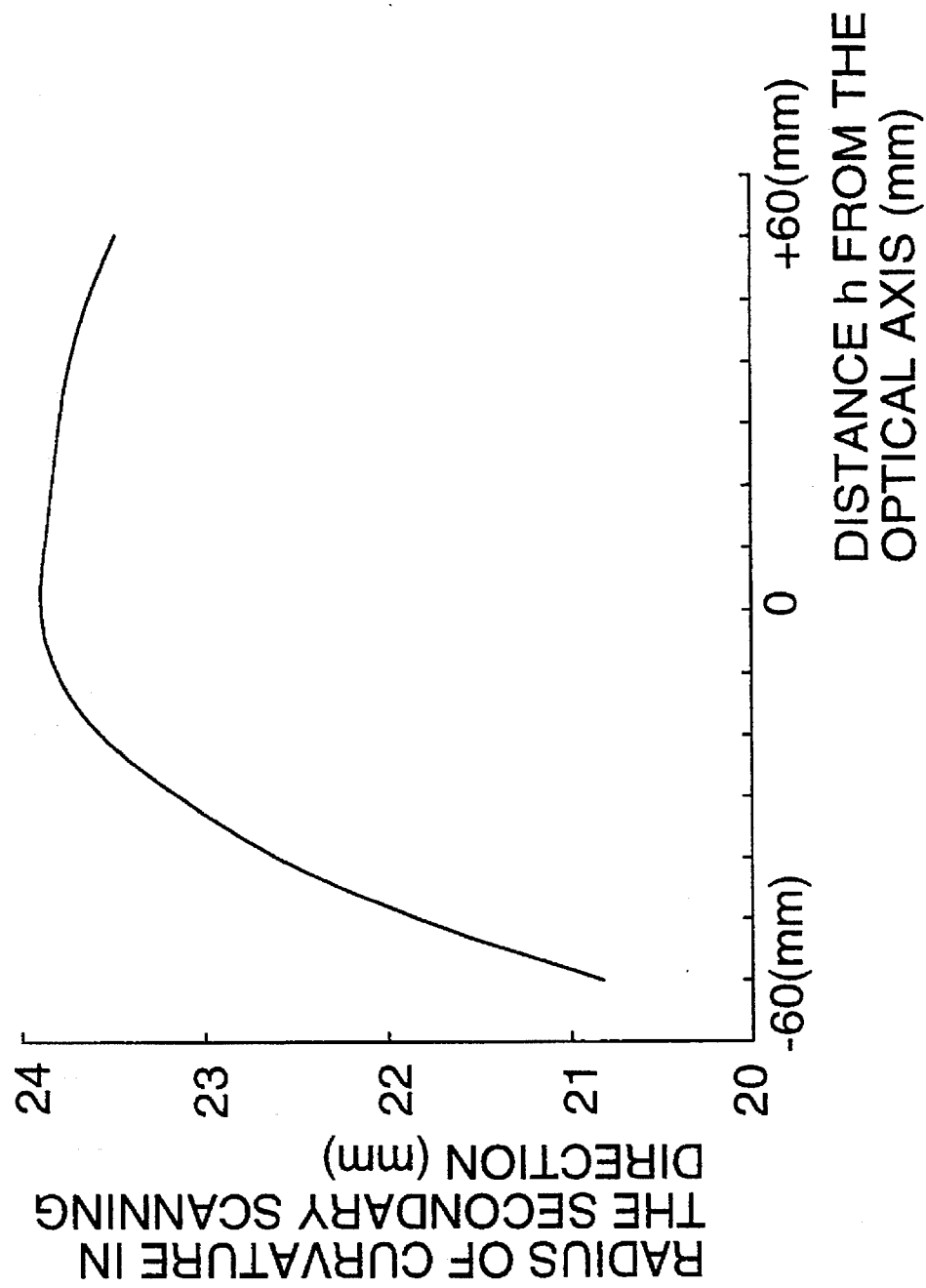
FIG. 9 is a sectional view of the primary scanning direction including the optical axis of the image formation lens system, wherein the sectional view shows a relationship of the radius of curvature rh of a secondary scanning direction of a deformed surface in the fourth embodiment of the optical scanning system of the present invention and a distance h from the optical axis of the image formation lens system.
Figure 10:
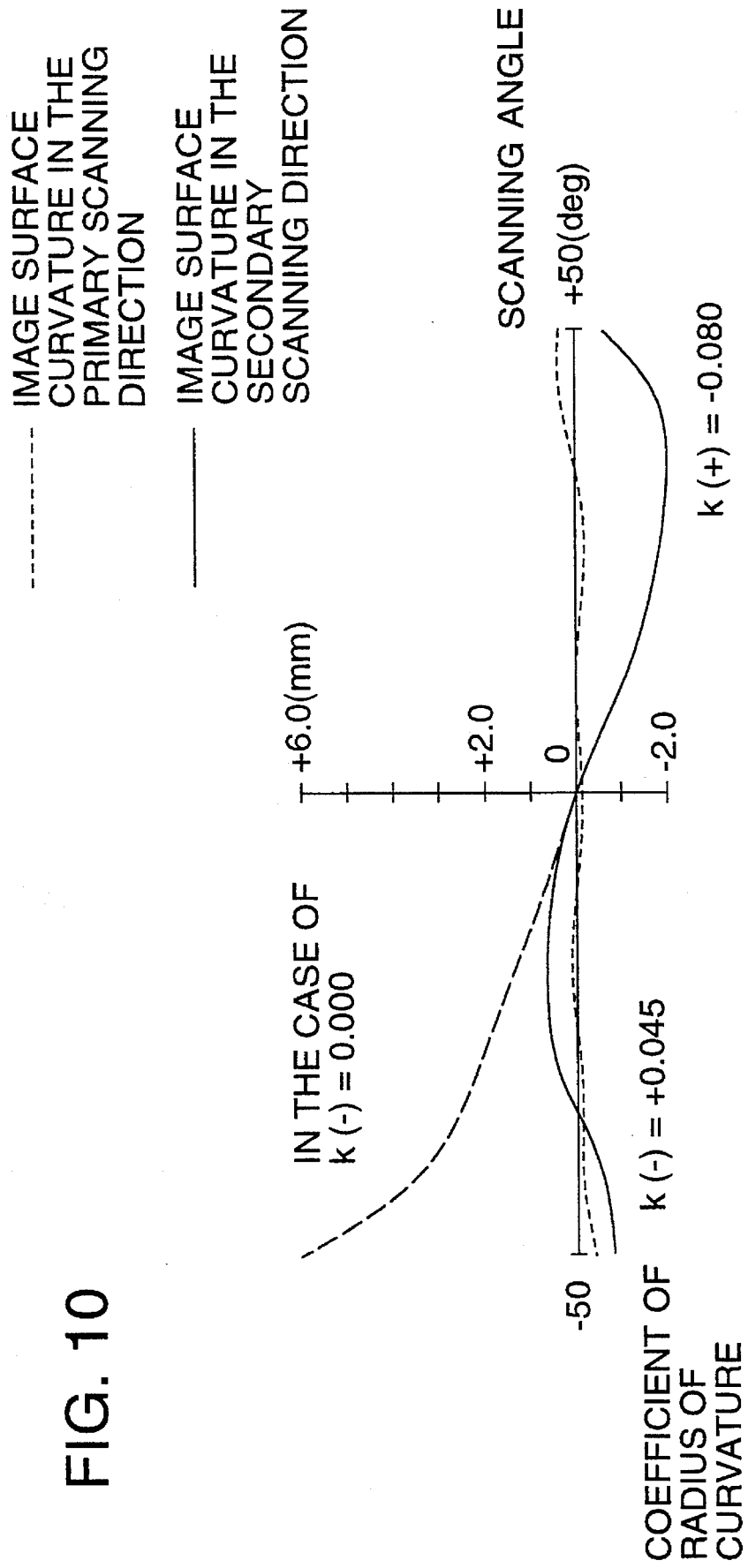
FIG. 10 is a view showing the curvature of an image surface in the first embodiment of the optical scanning system of the present invention.
Figure 11:
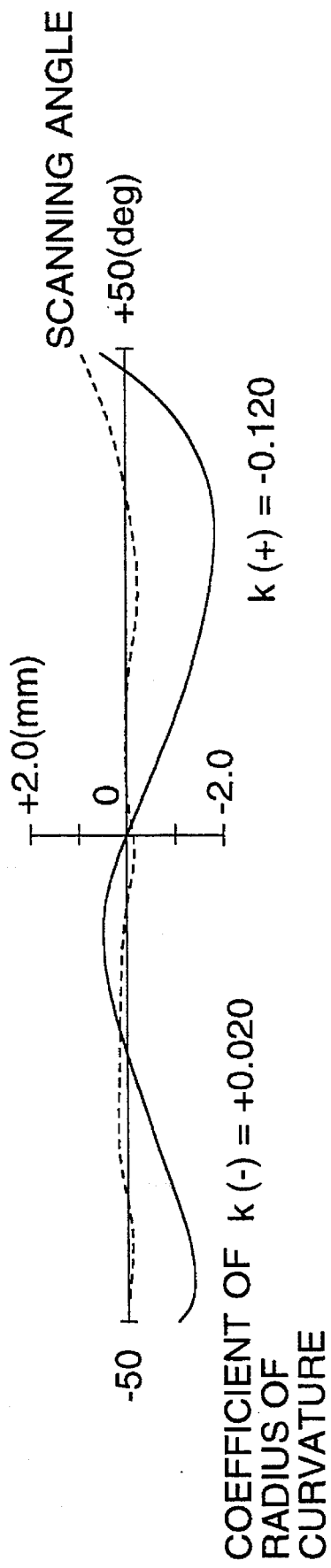
FIG. 11 is a view showing the curvature of an image surface in the second embodiment of the optical scanning system of the present invention.
Figure 12:
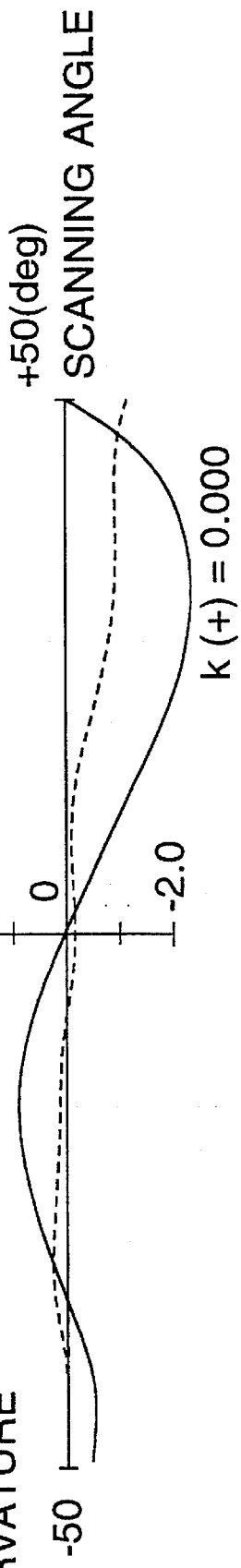
FIG. 12 is a view showing the curvature of an image surface in the third embodiment of the optical scanning system of the present invention.
Figure 13:
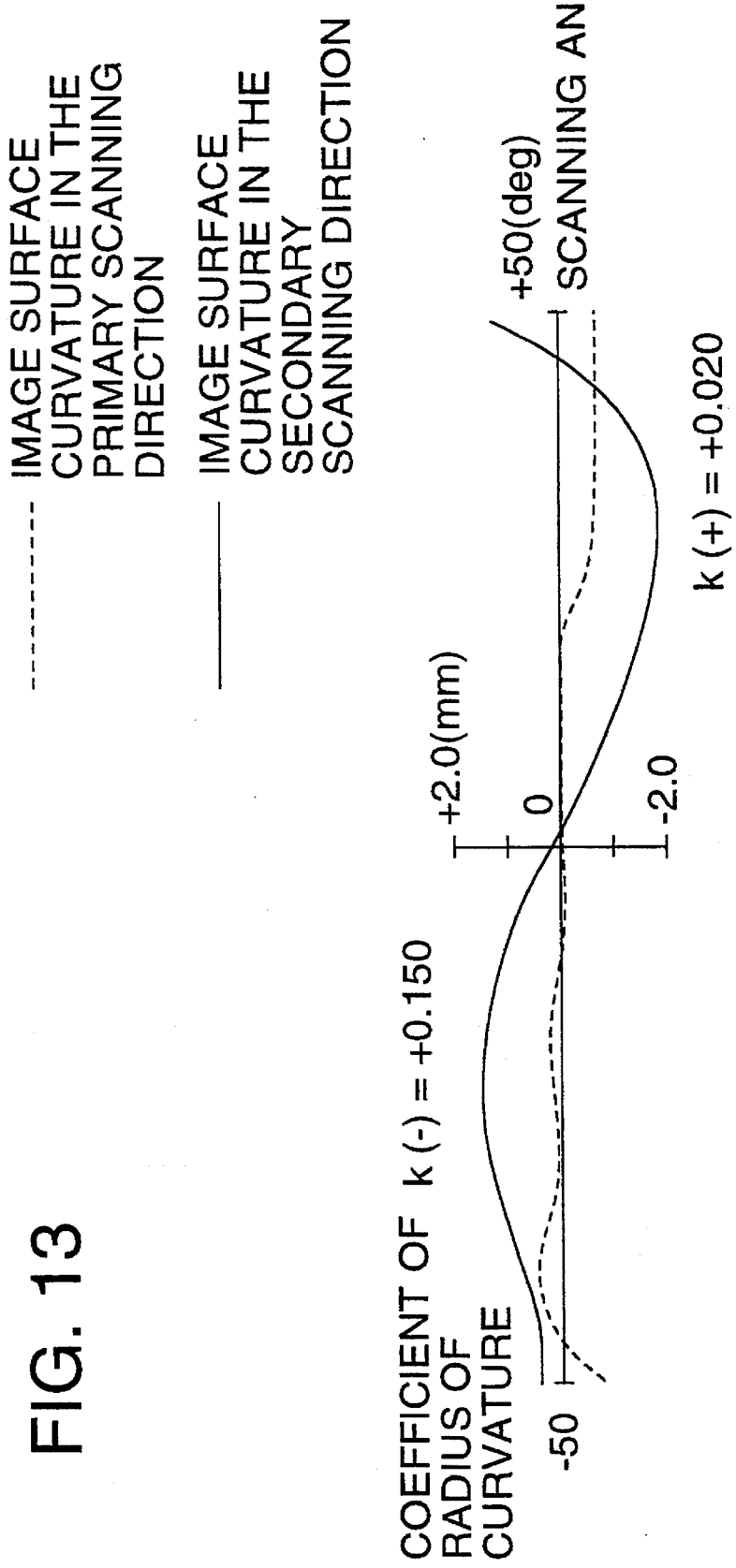
FIG. 13 is a view showing the curvature of an image surface in the fourth embodiment of the optical scanning system of the present invention.

Embodiments of an image formation leas system of an optical scanning device of the present invention will be described below. In the first and second embodiments, the radius of curvature on a surface of the secondary scanning direction of a deformed surface (in embodiments, a deformed cylindrical surface) is monotonously increased on the "+" image height side, and monotonously decreased on the "−" image height side. In the third embodiment, the radius of curvature on the surface of the secondary scanning direction is constant on the "+" image height side, and is monotonously decreased on the "−" image height side. In the fourth embodiment, the radius of curvature on the surface of the secondary scanning direction is monotonously decreased both on the "+" image height side and the "−" image height side.

In the following tables, R and r denote a radius of curvature of a surface, d denotes an interval between surfaces, and n denotes an index of refraction of a beam of light having a wave length of 780 nm.

In this connection, the third surface is an aspherical surface which is rotationally symmetric, and the fifth surface is an aspherical surface which is rotationally symmetric only on the surface of a primary scanning direction. The aspherical surfaces can be expressed by the following equation:

$$X = \frac{C\phi^2}{1+\sqrt{1-(1+\kappa)C^2\phi^2}} + \sum_i A_i \phi^{P_i} \quad \text{[Equation 1]}$$

$$\phi^2 = y^2 + z^2$$

C: curvature of the reference rotary quadratic curve
κ: conical coefficient

First Embodiment

| Surface number | R (mm)   | $r_0$ (mm) | d (mm) | n (780 nm) |
|----------------|----------|------------|--------|------------|
| 1              | ∞        |            | 25.0   |            |
| 2              | −67.920  |            | 10.5   | 1.51922    |
| 3              | −31.969  |            | 36.0   |            |
| 4              | −120.000 | +23.769    | 4.5    | 1.51922    |
| 5              | −347.918 | ∞          | 93.6   |            |

Aspherical Coefficient

Third surface $\kappa = -1.4065$
$A_1 = -0.29989 \times 10^{-5}$, $P_1 = 4$
$A_2 = -0.17861 \times 10^{-9}$, $P_2 = 6$
$A_3 = -0.90695 \times 10^{-12}$, $P_3 = 8$
$A_4 = +0.56824 \times 10^{-15}$, $P_4 = 10$ Fifth surface (only primary scanning direction)

$\kappa = +20.313$
$A_1 = -0.12037 \times 10^{-5}$, $P_1 = 4$
$A_2 = +0.27184 \times 10^{-9}$, $P_2 = 6$
$A_3 = -0.77473 \times 10^{-13}$, $P_3 = 8$
$A_4 = +0.12488 \times 10^{-16}$, $P_4 = 10$
$A_5 = -0.11626 \times 10^{-20}$, $P_5 = 12$

| | |
|---|---|
| Angle of incident light | α = 75.0 (deg) |
| Radius of inscribed circle of rotational polygonal mirror | Rp = 20.0 (mm) |
| Number of surfaces of rotational polygonal mirror | n = 6 |
| Coefficient of radius of curvature | k(+) = −0.080 |
| | k(−) = +0.045 |
| | k(−)\|R$_4$\| = 0.000375 |
| Effective scanning angle | ±50 (deg) |
| Distance between deflection | 169.6 (mm) |

Second Embodiment

| Surface number | R (mm)   | $r_0$ (mm) | d (mm) | n (780 nm) |
|----------------|----------|------------|--------|------------|
| 1              | ∞        |            | 25.0   |            |
| 2              | −71.042  |            | 10.5   | 1.61542    |
| 3              | −35.499  |            | 39.0   |            |
| 4              | −122.000 | +23.617    | 4.0    | 1.51922    |
| 5              | −527.726 | ∞          | 89.4   |            |

Aspherical Coefficient

Third surface $\kappa = -1.5811$
$A_1 = -0.27240 \times 10^{-5}$, $P_1 = 4$
$A_2 = -0.43775 \times 10^{-10}$, $P_2 = 6$
$A_3 = -0.62730 \times 10^{-12}$, $P_3 = 8$
$A_4 = +0.29797 \times 10^{-15}$, $P_4 = 10$ Fifth surface (only primary scanning direction)
(primary scanning direction: aspherical, secondary scanning direction: non-power)

$\kappa = -50.452$
$A_1 = -0.12121 \times 10^{-5}$, $P_1 = 4$
$A_2 = +0.24413 \times 10^{-9}$, $P_2 = 6$
$A_3 = -0.61922 \times 10^{-13}$, $P_3 = 8$
$A_4 = +0.88322 \times 10^{-17}$, $P_4 = 10$
$A_5 = -0.72026 \times 10^{-21}$, $P_5 = 12$

| | |
|---|---|
| Angle of incident light | α = 75.0 (deg) |
| Radius of inscribed circle of rotational polygonal mirror | Rp = 20.0 (mm) |
| Number of surfaces of rotational polygonal mirror | n = 6 |
| Coefficient of radius of curvature | k(+) = −0.120 |
| | k(−) = +0.020 |
| | k(−)\|R$_4$\| = 0.000164 |
| Effective scanning angle | ±50 (deg) |
| Distance between deflection point and photoreceptor | 167.9 (mm) |

Third Embodiment

| Surface number | R (mm)   | $r_0$ (mm) | d (mm) | n (780 nm) |
|----------------|----------|------------|--------|------------|
| 1              | ∞        |            | 25.0   |            |
| 2              | −71.222  |            | 10.0   | 1.68821    |
| 3              | −36.608  |            | 33.0   |            |
| 4              | −100.000 | +23.449    | 4.0    | 1.51922    |
| 5              | −390.756 | ∞          | 94.9   |            |

Aspherical Coefficient

Third surface $\kappa = -1.6244$
$A_1 = -0.23327 \times 10^{-5}$, $P_1 = 4$
$A_2 = +0.94517 \times 10^{-11}$, $P_2 = 6$
$A_3 = -0.50923 \times 10^{-12}$, $P_3 = 8$
$A_4 = +0.32105 \times 10^{-15}$, $P_4 = 10$ Fifth surface (only on primary scanning direction) surface)
(primary scanning direction: aspherical, secondary scanning direction: non-power)

$\kappa = -34.068$
$A_1 = -0.14263 \times 10^{-5}$, $P_1 = 4$
$A_2 = +0.36817 \times 10^{-9}$, $P_2 = 6$
$A_3 = -0.10976 \times 10^{-12}$, $P_3 = 8$
$A_4 = +0.18530 \times 10^{-16}$, $P_4 = 10$
$A_5 = -0.16955 \times 10^{-20}$, $P_5 = 12$

| | |
|---|---|
| Angle of incident light | α = 75.0 (deg) |
| Radius of inscribed circle of rotational polygonal mirror | Rp = 20.0 (mm) |
| Number of surfaces of rotational polygonal mirror | n = 6 |
| Coefficient of radius of curvature | k(+) = 0 |
| | k(−) = +0.130 |
| | k(−)\|R$_4$\| = 0.00130 |
| Effective scanning angle | ±50 (deg) |
| Distance between deflection point and photoreceptor | 166.9 (mm) |

Fourth Embodiment

| Surface number | R (mm)   | $r_0$ (mm) | d (mm) | n (780 nm) |
|----------------|----------|------------|--------|------------|
| 1              | ∞        |            | 25.0   |            |
| 2              | −61.518  |            | 10.5   | 1.71043    |
| 3              | −36.167  |            | 32.0   |            |
| 4              | −100.000 | +23.830    | 4.0    | 1.51922    |
| 5              | −198.717 | ∞          | 101.5  |            |

Aspherical Coefficient

Third surface $\kappa = -1.5474$
$A_1 = -0.24562 \times 10^{-5}$, $P_1 = 4$
$A_2 = -0.18336 \times 10^{-9}$, $P_2 = 6$
$A_3 = -0.10510 \times 10^{-12}$, $P_3 = 8$
$A_4 = +0.18818 \times 10^{-15}$, $P_4 = 10$ Fifth surface (only on primary scanning direction) surface)
(primary scanning direction: aspherical, secondary scanning direction: non-power)

$\kappa = +0.87599$
$A_1 = -0.13154 \times 10^{-5}$, $P_1 = 4$
$A_2 = +0.29301 \times 10^{-9}$, $P_2 = 6$
$A_3 = -0.13407 \times 10^{-12}$, $P_3 = 8$
$A_4 = +0.32171 \times 10^{-16}$, $P_4 = 10$
$A_5 = -0.44844 \times 10^{-20}$, $P_5 = 12$ -continued

| | |
|---|---|
| Angle of incident light | α = 75.0 (deg) |
| Radius of inscribed circle of rotational polygonal mirror | Rp = 20.0 (mm) |
| Number of surfaces of rotational polygonal mirror | n = 6 |
| Coefficient of radius of curvature | k(+) = −0.020 |
| | k(−) = +0.150 |
| | k(−)\|R₄\| = 0.00150 |
| Effective scanning angle | ±50 (deg) |
| Distance between deflection point and photoreceptor | 172.5 (mm) |

Figure 14:
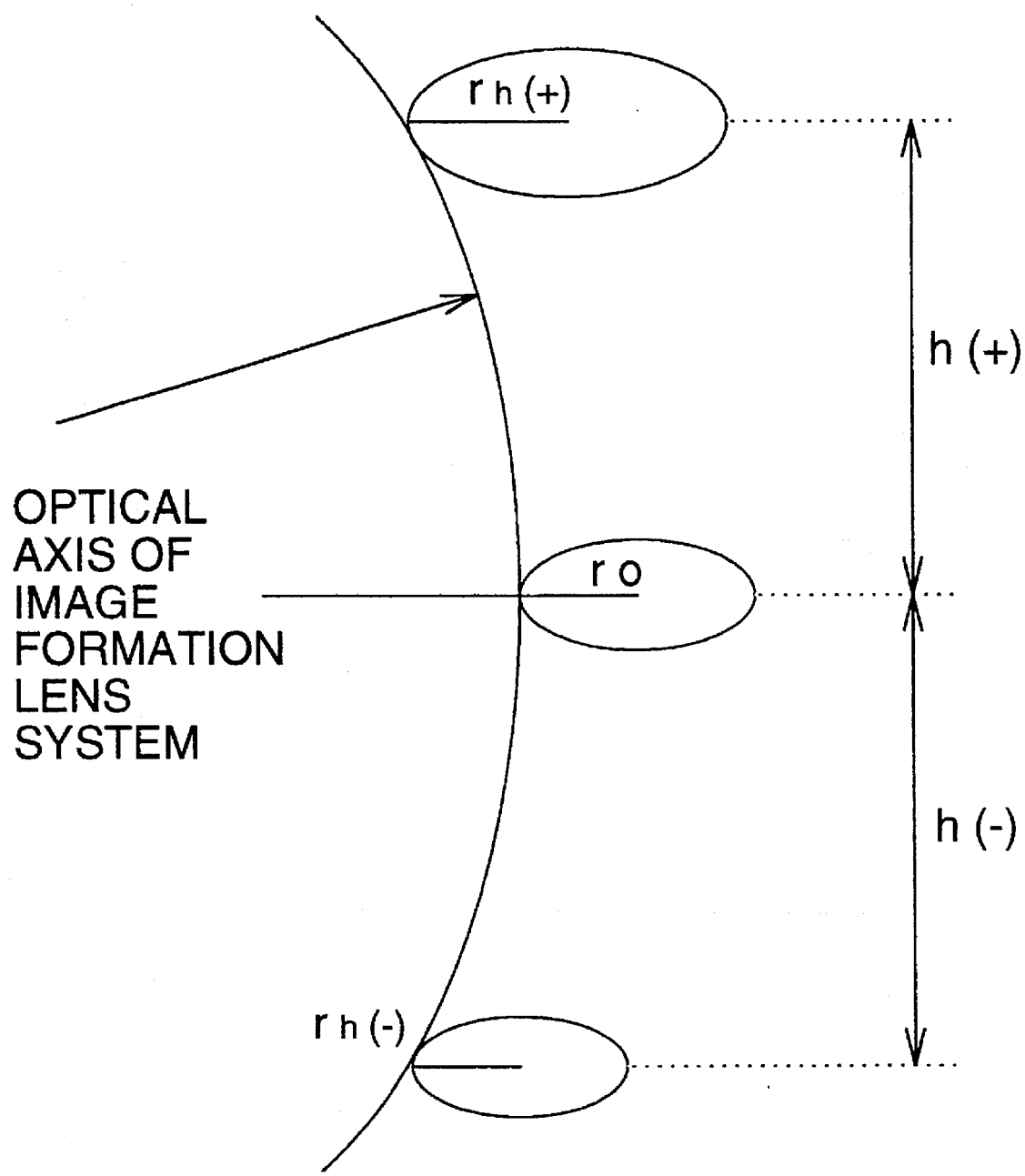
FIGS. 14(a) and 14(b) are schematic illustrations showing the configuration of a non-symmetrical surface with respect to the optical axis of the image formation cylindrical lens system of the present invention.
FIG. 14(c) is a cross-section on line 14c—14c of FIG. 14(b).
Figure 15:
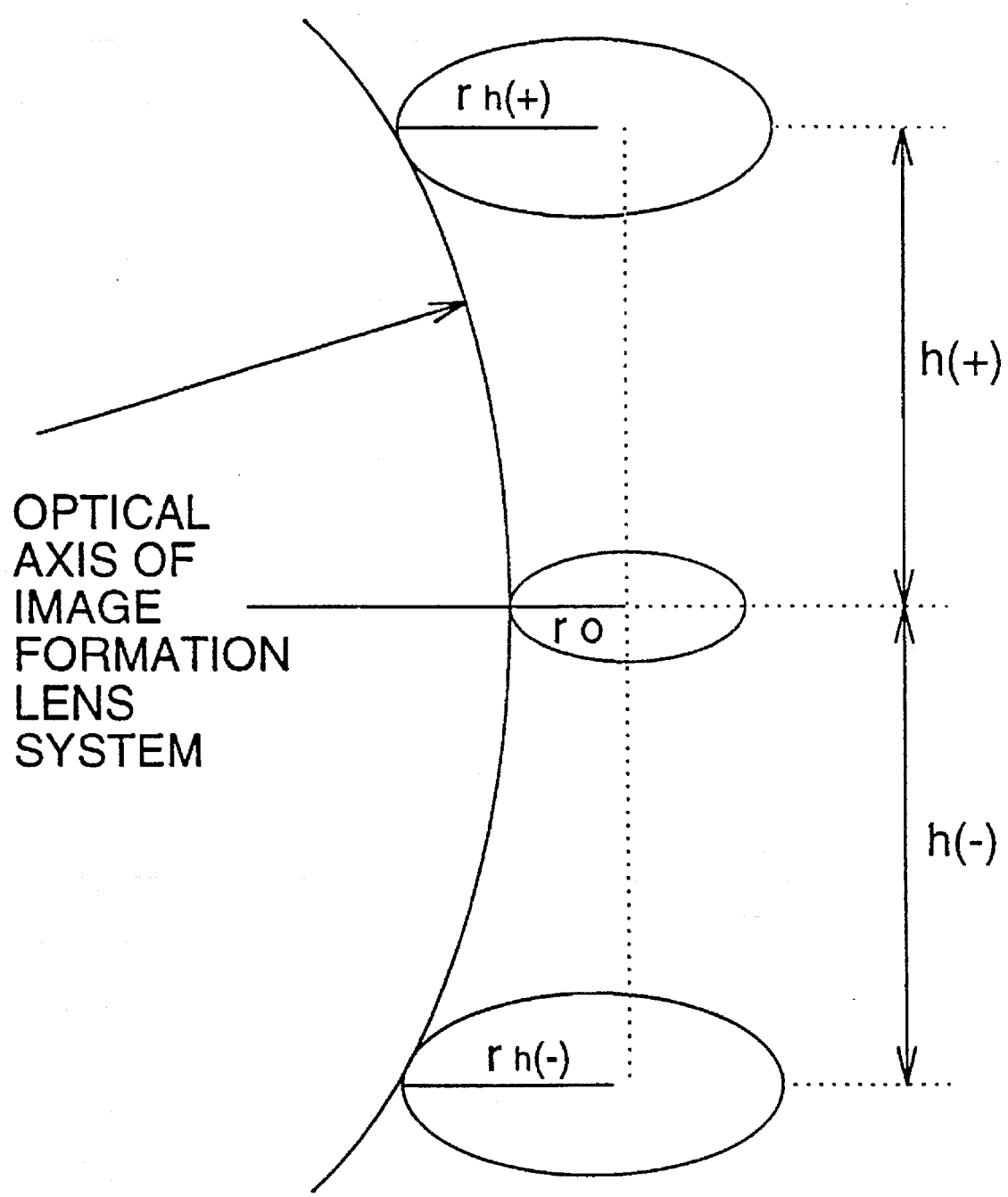
FIG. 15 is a diagram showing the configuration of a conventional deformed surface which is formed symmetrically with respect to the optical axis of the image formation lens.
Figure 16:
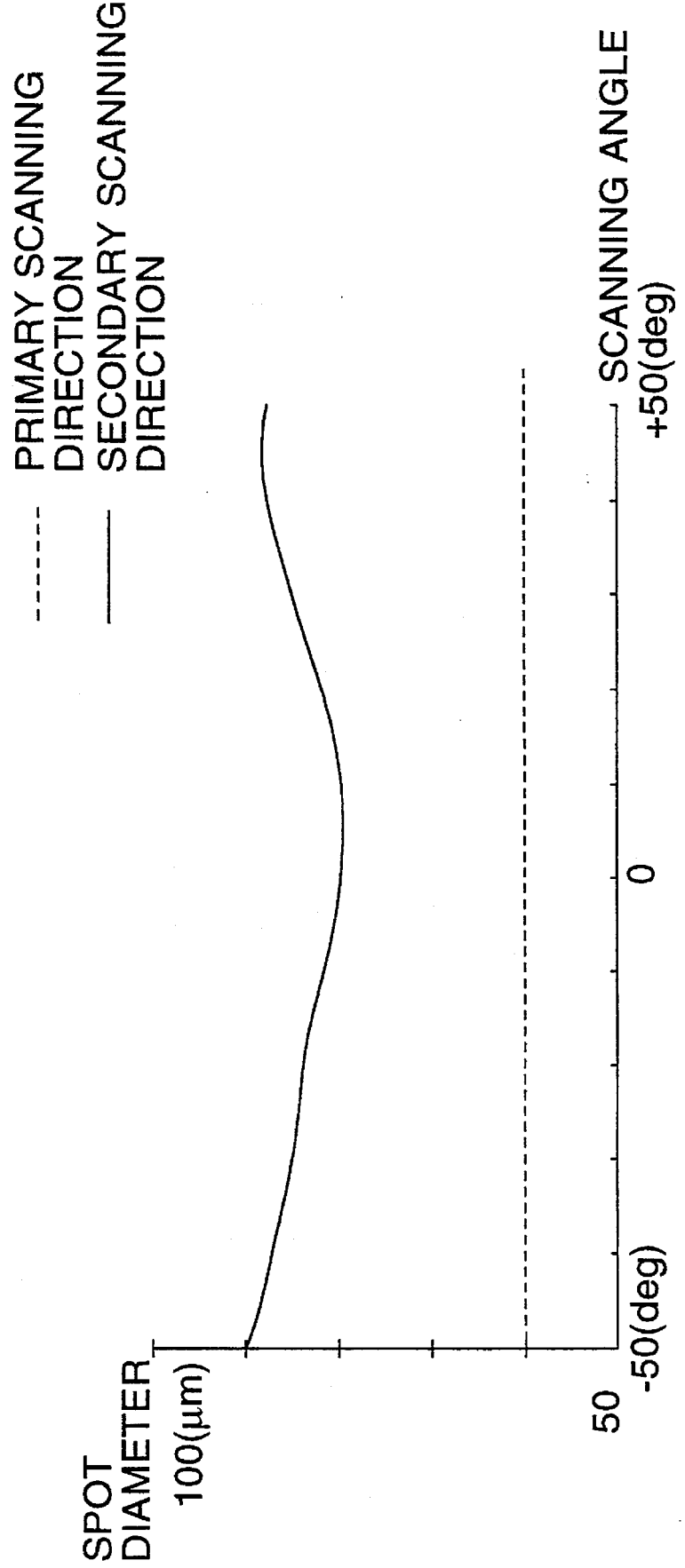
FIG. 16 is a view showing the spot diameter on the entire image formation area in the primary scanning direction and the secondary scanning direction of the image formation lens system in the first embodiment of the optical scanning system of the present invention.
Figure 17:
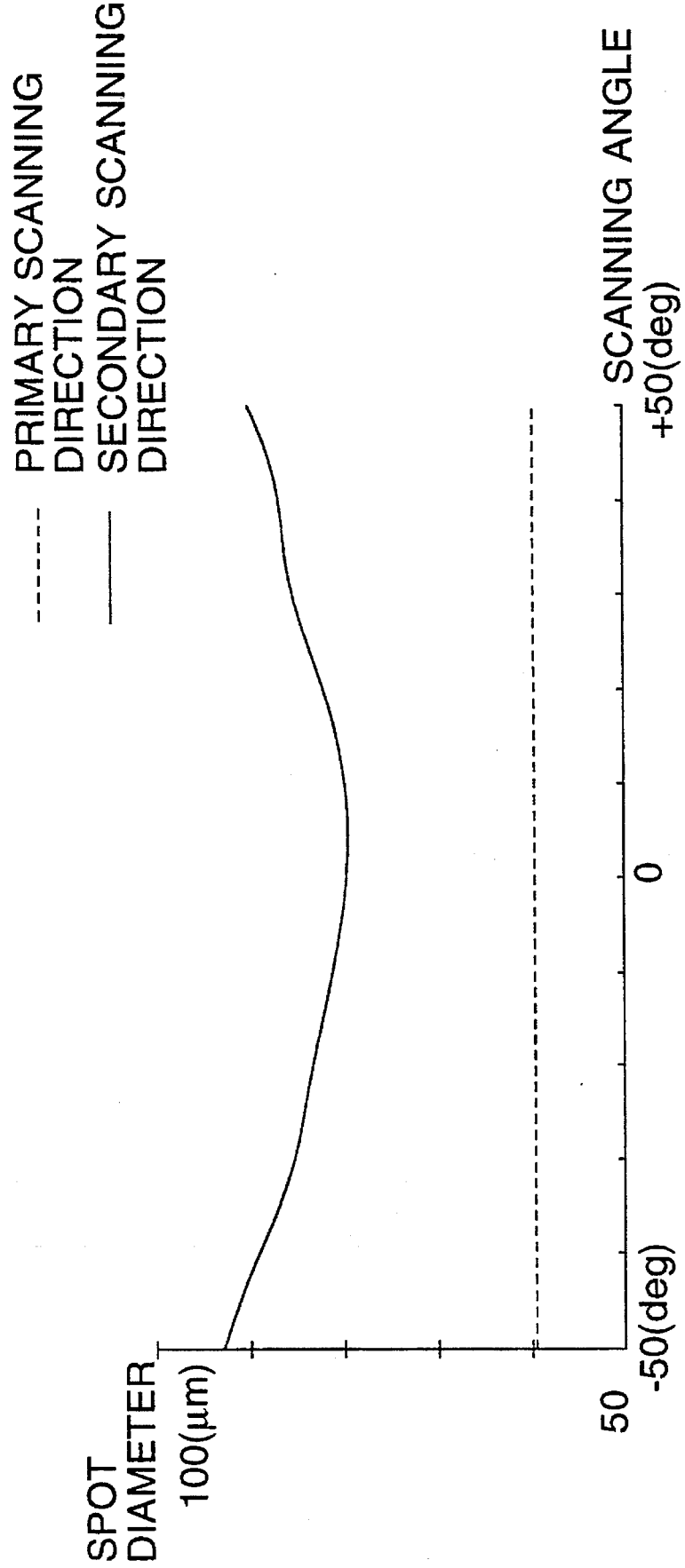
FIG. 17 is a view showing the spot diameter on the entire image formation area in the primary scanning direction and the secondary scanning direction of the image formation lens system in the second embodiment of the optical scanning system of the present invention.
Figure 18:
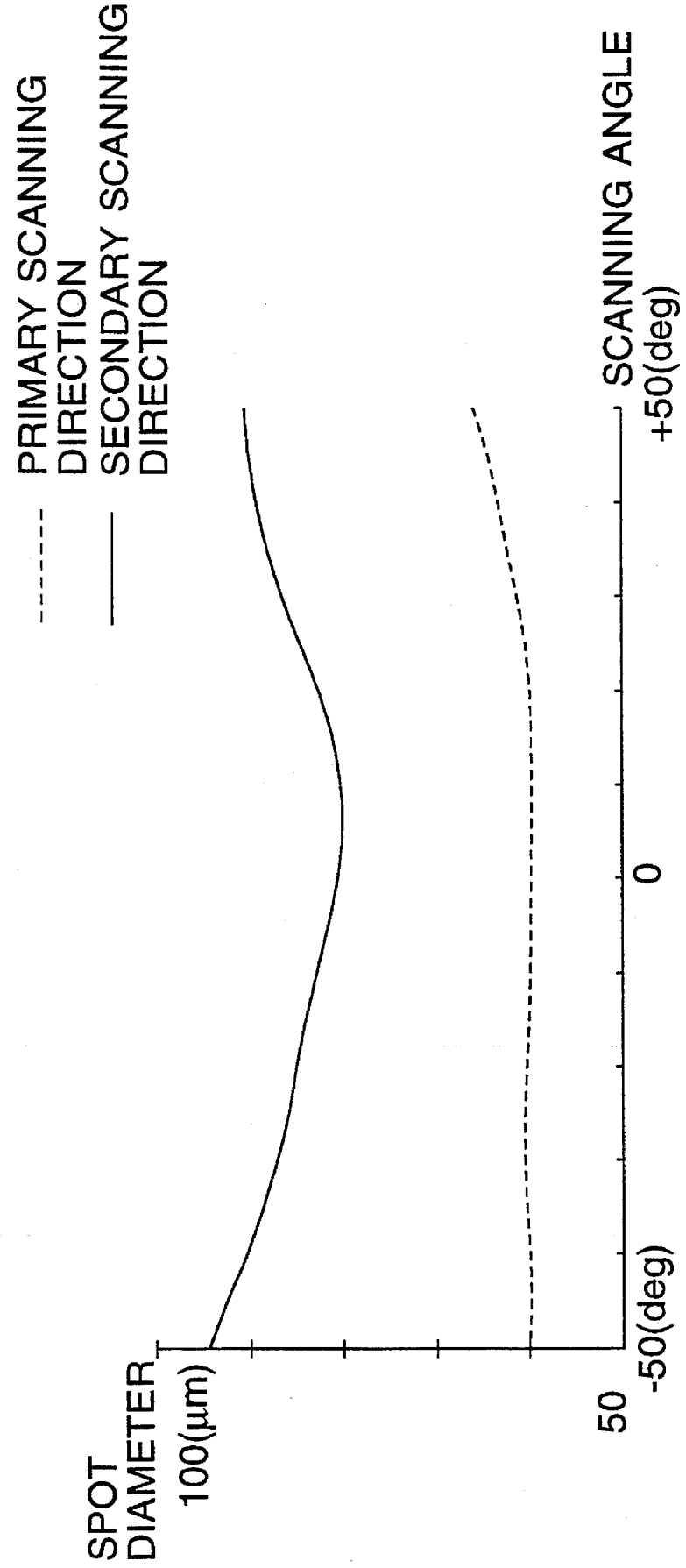
FIG. 18 is a view showing the spot diameter on the entire image formation area in the primary scanning direction and the secondary scanning direction of the image formation lens system in the third embodiment of the optical scanning system of the present invention.
Figure 19:
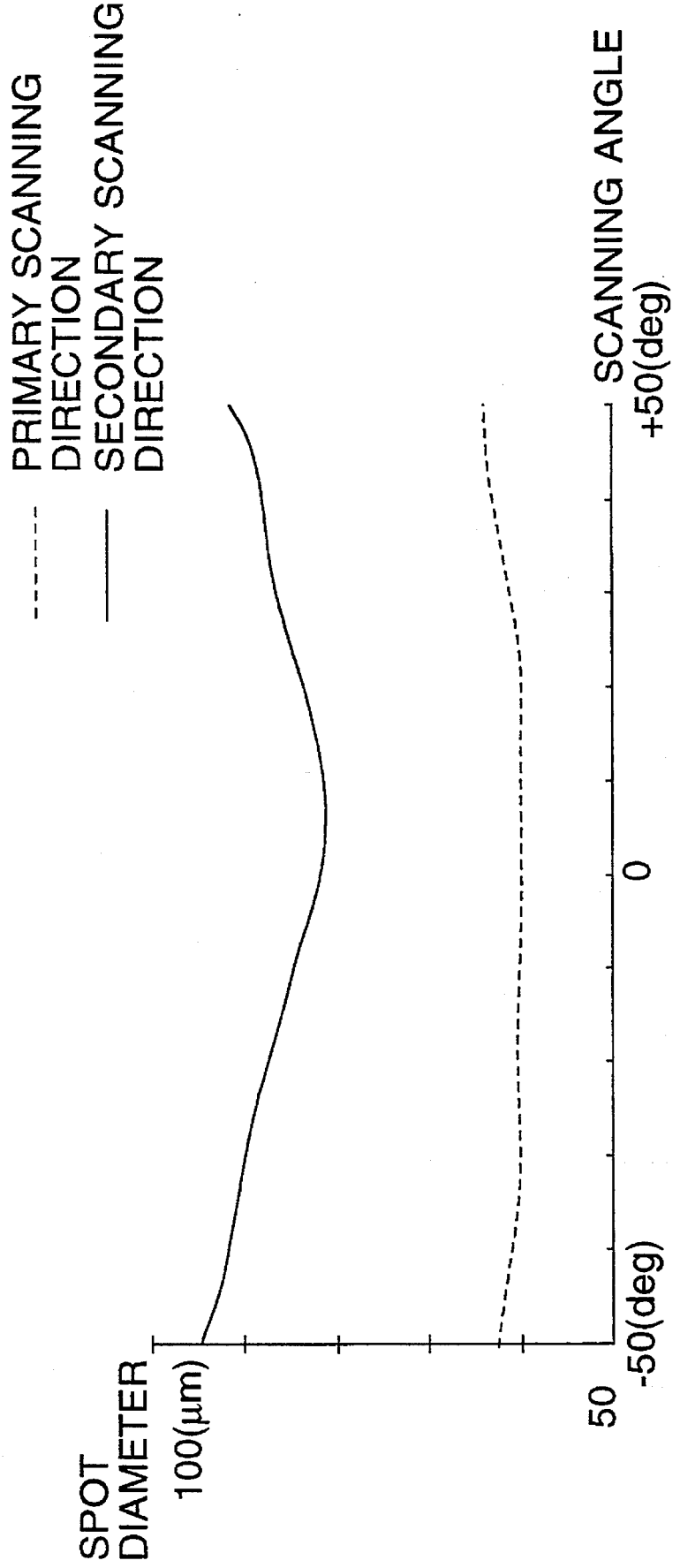
FIG. 19 is a view showing the spot diameter on the entire image formation area in the primary scanning direction and the secondary scanning direction of the image formation lens system in the fourth embodiment of the optical scanning system of the present invention.

In the optical scanning system of the present invention, the non-symmetrical cylindrical lens illustrated in FIGS. 14(a), 14(b), and 14(c) is utilized. As a result, as shown in each embodiment, a view of aberration and a view of the spot diameter with respect to the scanning angle, when only two image formation lenses are used, non-symmetry of the image surface curvature on the secondary scanning direction surface caused when a rotational polygonal mirror is used as a deflection means, can be appropriately corrected. As a result, an approximately uniform spot diameter can be obtained over the entire image formation area. Accordingly, a highly efficient light beam scanning device can be realized, and the manufacturing cost can be reduced when the lens is made of plastics.

Further, a compact optical scanning system can be obtained for the following reasons: the scanning angle is large; the distance between a deflection point and a photoreceptor, which is necessary for covering a necessary image surface, is short; and the length of a lens necessary for covering the large scanning angle becomes short since the curvature of the lens is large.

Incidentally, in the above embodiments, the deformed surface according to the present invention is applied to the fourth surface as one example. However, the deformed surface can be applied to the other surface.

What is claimed is:

1. An apparatus for scanning an image forming surface with a laser beam, comprising:

a laser generator for generating a laser beam;

a rotatable polygonal mirror, having an axis of rotation, for deflecting the laser beam to scan the image forming surface in a primary scanning direction; and an image formation lens system, including a lens, provided between the polygonal mirror and the image forming surface, for focusing the laser beam on the image forming surface, the lens system having an optical axis, the polygonal mirror being arranged in relation to the optical axis of the lens system in such a manner that the rotation axis of the polygonal mirror is deviated to one side of the optical axis of the lens system, wherein the one side is defined as a "+" side and an opposite side is defined as a "−" side, the lens of the lens system having a cylindrical surface facing the polygonal mirror, wherein the cylindrical surface is curved in a secondary scanning direction, a radius of curvature "rh" represents a radius of curvature of the cylindrical surface in a plane perpendicular to the primary scanning direction at a distance h from the optical axis in the primary scanning direction, a change pattern in the radius of curvature "rh" is non-symmetrical in relation to the optical axis, and "rh(−)" is smaller than "r₀", wherein "rh(−)" is the radius of curvature "rh" at each point on the "−" side and "r₀" is the radius of curvature at a point on the optical axis.

2. The apparatus of claim 1, wherein the radius of curvature "rh(−)" monotonously decreases as the distance h from the optical axis in the primary scanning direction increases.

3. The apparatus of claim 2, wherein the minimum value \|rh(−)\|min of the radius of curvature "rh(−)" is located at an end point on the "−" side.

4. The lens of claim 3, wherein the radius of curvature "rh" at each point on the "+" side is defined as "rh(+)", with "rh(+)" being larger than the radius of curvature "r₀" at a point on the optical axis.

5. The apparatus of claim 4, wherein the maximum value \|rh(+)\|max of the radius of curvature "rh(+)" is located at an end point on the "+" side.

6. The apparatus of claim 3, wherein the radius of curvature "rh" at each point is increased toward the end of the "+" side of the optical axis.

7. The apparatus of claim 3, wherein the lens cylindrical surface is further curved in the primary scanning direction with a radius of curvature "R", and the radius of curvature "rh" at each point in the primary scanning direction is represented by the following formula:

$$rh(-) = r_0 - k(-)\{|R| - \sqrt{R^2 - h^2}\},$$

wherein h is a distance of each point from the optical axis of the image formation lens system, and when a point is located at the "−" side, h≤0, and k(−) is a radius of curvature coefficient at the "−" side and satisfies the following formula:

$$0 < k(-)/|R| \leq 0.003.$$

8. The apparatus of claim 3, wherein the radius of curvature "rh" at each point on the "+" side is defined as "rh(+)", with "rh(+)" being smaller than the radius curvature "r₀" at a point on the optical axis.

9. The apparatus of claim 8, wherein the minimum value \|rh(+)\|min of the radius of curvature "rh(+)" is located at an end point on the "+" side.

10. The apparatus of claim 9, wherein the minimum value \|rh(−)\|min of the radius of curvature "rh(−)" is located at an end point on the "−" side.

11. The apparatus of claim 3, wherein the radius of curvature "rh" at each point is decreased toward the end of the "+" side of the optical axis.

12. The apparatus of claim 3, wherein the radius of curvature "rh(+)" has a constant value and is the radius of curvature "rh" at each point on the "+" side.

13. A lens system for use in an apparatus for scanning an image forming surface with a laser beam which comprises a rotatable polygonal mirror for deflecting the laser beam so as to scan the image forming surface in a primary scanning direction, wherein the lens system is provided between the polygonal mirror and the image forming surface to focus the laser beam on the image forming surface, comprising:

an optical axis, wherein the polygonal mirror is arranged in relation to the optical axis of the lens system in such a manner that a rotation axis of the polygonal mirror is deviated to one side of the optical axis of the lens system, wherein the one side is defined as a "+" side and an opposite side is defined as a "−" side; and a cylindrical lens having a cylindrical surface facing the polygonal mirror, wherein the cylindrical surface is curved in a secondary scanning direction, a radius of curvature "rh" represents a radius of curvature of the cylindrical surface in a plane perpendicular to the primary scanning direction at a distance h from the optical axis in the primary scanning direction, a change pattern in the radius of curvature "rh" is non-symmetrical in relation to the optical axis, and "rh(−)" is smaller than "$r_0$", wherein "rh(−)" is the radius of curvature "rh" at each point on the "−" side and "$r_0$" is the radius of curvature at a point on the optical axis.

14. The apparatus of claim 13, wherein the radius of curvature "rh(−)" monotonously decreases as the distance h from the optical axis in the primary scanning direction increases.

15. The lens of claim 14, wherein the minimum value |rh(−)|min of the radius of curvature "rh(−)" is located at an end point on the "−" side.

16. The lens of claim 15, wherein the radius of curvature "rh" at each point on the "+" side is defined as "rh(+)", with "rh(+)" being larger than the radius of curvature "$r_0$" at a point on the optical axis.

17. The lens of claim 16, wherein the maximum value |rh(+)|max of the radius of curvature "rh(+)" is located at an end point on the "+" side.

18. The lens of claim 15, wherein the radius of curvature "rh" at each point is increased toward the end of the "+" side of the optical axis.

19. The lens of claim 15, wherein the lens surface is further curved in the primary scanning direction with a radius of curvature "R", and the radius of curvature "rh" at each point in the primary scanning direction is represented by the following formula:

$$rh(-) = r_0 - k(-)\{|R| - \sqrt{R^2 - h^2}\},$$

wherein h is a distance of each point from the optical axis, and when a point is located at the "−" side, h≦0, and k(−) is a radius of curvature coefficient at the "−" side and satisfies the following formula:

$$0 \leq k(-)/|R| \leq 0.003.$$

20. The lens of claim 15, wherein the radius of curvature "rh" at each point on the "+" side is defined as "rh(+)", with "rh(+)" being smaller than the radius curvature "$r_0$" at a point on the optical axis.

21. The lens of claim 20, wherein the minimum value |rh(+)|min of the radius of curvature "rh(+)" is located at an end point on the "+" side.

22. The lens of claim 21, wherein the minimum value |rh(−)|min of the radius of curvature "rh(−)" is located at an end point on the "−" side 23. The apparatus of claim 15, wherein the radius of curvature "rh(+)" has a constant value and is the radius of curvature "rh" at each point on the "+" side.

24. The lens of claim 11, wherein the radius of curvature "rh" at each point is decreased toward the end of the "+" side of the optical axis.

* * * * *